T. GOSERUD.
LOCK NUT.
APPLICATION FILED NOV. 22, 1917.

1,267,656. Patented May 28, 1918.

Inventor
Thorwald Goserud
By Chnow&Co.
Attorneys

UNITED STATES PATENT OFFICE.

THORWALD GOSERUD, OF STURGEON BAY, WISCONSIN.

LOCK-NUT.

1,267,656.  Specification of Letters Patent.  Patented May 28, 1918.

Application filed November 22, 1917. Serial No. 203,418.

*To all whom it may concern:*

Be it known that I, THORWALD GOSERUD, a citizen of the United States, residing at Sturgeon Bay, in the county of Door and State of Wisconsin, have invented a new and useful Lock-Nut, of which the following is a specification.

The subject of this invention is a lock nut, and the objects of the invention are, first, to provide means for coupling a nut and bolt against relative movement, second, to provide means for locking a nut and its bolt against relative movement in one direction while permitting movement in the reverse direction, third, to provide a simple, durable and efficient lock nut.

With the foregoing and other objects in view which will appear as the description proceeds, the invention resides in the combination and arrangement of parts and in the details of construction hereinafter described and claimed it being understood that changes in the precise embodiment of the invention herein disclosed, can be made within the scope of what is claimed, without departing from the spirit of the invention.

Practical embodiments of the invention are shown in the accompanying drawing, wherein.

Figure 1:
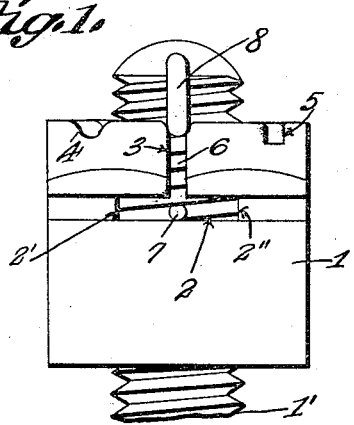
Figure 1 is a view in elevation of a nut constructed in accordance with the invention shown in place upon a bolt.
Figure 2:
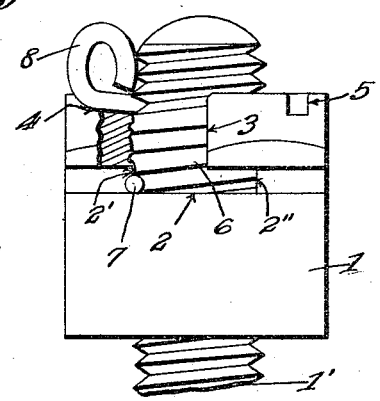
Fig. 2 is a similar view with a portion broken away and the locking means in a different position.
Figure 3:
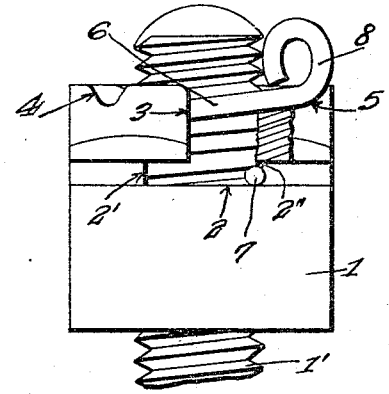
Fig. 3 is a similar view with the locking means in still another position.
Figure 4:
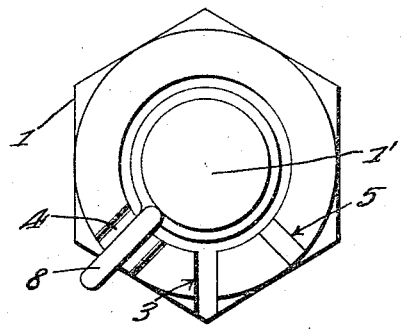
Fig. 4 is a plan view.

Referring to the drawing by numerals of reference:

In carrying out the invention a nut 1 is provided which may be of any suitable and well known form which is provided with a transverse slot 2 which communicates with the central bore of the nut. Another slot 3 is disposed radially of the nut to one side of the center bore and extends from the outer face of the nut to the transverse slot 2.

A notch 4 is formed in the outer face of the nut and this notch is positioned to that side of the slot 3 away from which the nut turns in screwing off the bolt 1'. Another notch 5 is formed in the outer face adjacent to and on the opposite side of the slot 3.

The nut is counterbored from its outer face for a sufficient distance to form a space for the reception of a coiled spring or wire 6 the inner end 7 of which is bent outwardly to extend within the slot 2 while the other or outer end 8 is likewise bent outwardly to selectively enter the slot 3 or the notches 4 or 5.

As will be readily understood, when the outer end 8 is in the slot 3 the nut may be turned to screw on the bolt as pressure of the nut against the end 8 tends to spread the coil and release its grip upon the bolt.

When the outer end 8 of the spring is in the notch 4 the inner end 7 will be thrown against the edge 2' of the slot 2 and as the nut is turned to screw off the bolt the edge 2' will press against the end 7 and expand the coil to release the bolt.

With the outer end 8 in the notch 5, the inner end 7 will contact the edge 2'' of the slot 2 and which ever way the nut is turned the coil will be contracted to grip the bolt and lock the nut against turning.

Figure 5:
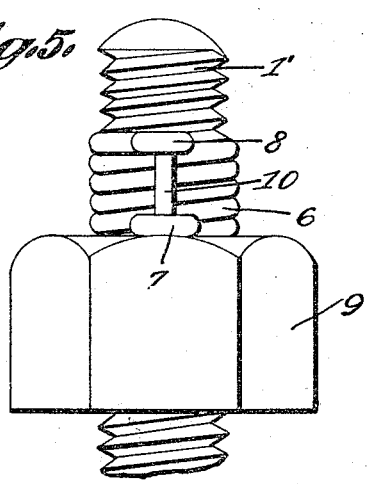
Fig. 5 is a view in elevation of a modified form.

In Fig. 5 the bolt 1' is provided with a nut 9 in which is secured a pin 10 which projects from the outer face of the nut.

The outer end 8 of the coil 6 is looped about the pin 10 while the inner end 7 is bent to contact the pin and be pressed upon by the pin when the nut is turned to screw on the bolt. This locks the nut against motion in either direction.

Figure 6:
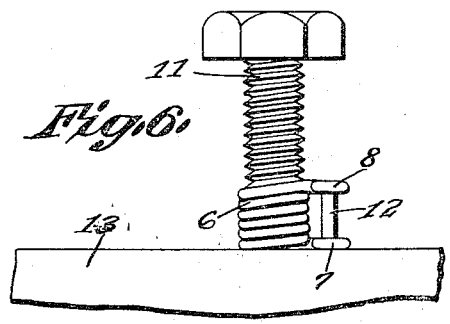
Fig. 6 is a similar view of the modification applied to a set screw.

In Fig. 6 the coil is shown as locking a set screw 11 in place. In this case the pin 12 is secured in and projects from the face of the object 13 into which the set screw is to be threaded. The arrangement is the same as that described in relation to Fig. 5.

Having thus described the invention what is claimed as new and sought by Letters Patent, is:

1. The combination with a bolt and a nut therefor, of an element encircling the bolt, and means on the nut for selectively engaging the element, whereby the nut is locked to the bolt against movement in one direction, or in the reverse direction, or in either direction.

2. The combination with an exteriorly threaded element, and an interiorly threaded element adapted thereto, of a coil surrounding the exteriorly threaded element and having bent ends, and means on the interiorly threaded element for selectively engaging the ends to lock the elements against relative movement in one direction, or in the reverse direction, or in either direction.

3. The combination with a bolt and a nut therefor, said nut being counter bored, of a coil surrounding the bolt and seated in the counter bore, the ends of said coil bent outwardly, said nut provided with a transverse slot into which one end of the coil projects, and a longitudinal slot and notches into which the other end of the coil selectively projects, whereby the nut and bolt are locked against relative movement.

In testimony that I claim the foregoing as my own, I have hereto affixed my signature in the presence of two witnesses.

THORWALD GOSERUD.

Witnesses:
R. KERLOCHE,
N. C. GARLAND.